United States Patent
Hill et al.

(10) Patent No.: US 11,226,035 B1
(45) Date of Patent: Jan. 18, 2022

(54) TRANSMISSION SHIFTING CONTROL SYSTEM

(71) Applicant: FORD GLOBAL TECHNOLOGIES, LLC, Dearborn, MI (US)

(72) Inventors: Thaddeus Hill, Livonia, MI (US); Markian Oleh Diakiw, Livonia, MI (US); Robert Kowalske, Brighton, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 17/115,921

(22) Filed: Dec. 9, 2020

(51) Int. Cl.
  *F16H 61/16* (2006.01)
  *F16H 61/02* (2006.01)
  *F16H 59/18* (2006.01)
  *F16H 59/66* (2006.01)
  *F16H 59/50* (2006.01)

(52) U.S. Cl.
  CPC ............ *F16H 61/16* (2013.01); *F16H 59/18* (2013.01); *F16H 59/50* (2013.01); *F16H 59/66* (2013.01); *F16H 61/0213* (2013.01); *F16H 2059/506* (2013.01); *F16H 2059/663* (2013.01); *F16H 2061/163* (2013.01)

(58) Field of Classification Search
  CPC ...... F16H 61/16; F16H 59/66; F16H 61/0213; F16H 59/18; F16H 59/50; F16H 2059/663; F16H 2059/506; F16H 2061/163

USPC .............................................. 701/56, 65, 66
  See application file for complete search history.

(56) References Cited

U.S. PATENT DOCUMENTS

| | | | |
|---|---|---|---|
| 5,850,887 A | 12/1998 | Nakashima et al. | |
| 5,911,771 A * | 6/1999 | Reichart | F16H 59/60 701/65 |
| 7,369,931 B2 | 5/2008 | Kjell et al. | |
| 8,457,849 B2 | 6/2013 | Mair | |
| 2018/0156329 A1* | 6/2018 | Hose | B60W 10/11 |

FOREIGN PATENT DOCUMENTS

| | | | |
|---|---|---|---|
| CN | 111577882 B * | 4/2021 | |
| EP | 1057682 A1 | 12/2000 | |
| WO | WO-2010118917 A1 * | 10/2010 | F16H 61/0213 |

* cited by examiner

*Primary Examiner* — Roger L Pang
(74) *Attorney, Agent, or Firm* — Vincent Mastrogiacomo; Brooks Kushman P.C.

(57) ABSTRACT

A vehicle includes a powerplant, at least one drive wheel, a transmission, and a controller. The powerplant is configured to generate power to propel the vehicle. The transmission is configured to deliver power from the powerplant to the at least one drive wheel. The controller is programmed to, in response to a scheduled upshift of the transmission and detection of a set of conditions that are indicative of the vehicle climbing while on loose terrain, override upshifting the transmission and maintain a current gear of the transmission. The controller is further programmed to, in response to the scheduled upshift of the transmission and non-detection of at least one condition of the set of conditions that are indicative of the vehicle climbing while on loose terrain, upshift the transmission.

20 Claims, 2 Drawing Sheets

TRANSMISSION SHIFTING CONTROL SYSTEM

TECHNICAL FIELD

The present disclosure relates to vehicles having transmissions and control systems for shifting transmissions.

BACKGROUND

Vehicles may include transmissions that are configured to deliver power from a powerplant to one or more drive wheels.

SUMMARY

A vehicle includes a powerplant, at least one drive wheel, a step-ratio transmission, an accelerator pedal, and a controller. The powerplant is configured to generate power to propel the vehicle. The step-ratio transmission is configured to deliver power from the powerplant to the at least one drive wheel. The step-ratio transmission has a shift schedule that corresponds to an off-road driving mode. The controller is programmed to, in response to selection of the off-road driving mode, a scheduled upshift of the step-ratio transmission according to the shift schedule, a slip of the at least one drive wheel exceeding a first threshold, a pitch of the vehicle exceeding a second threshold, and a position of the accelerator pedal exceeding a third threshold, override upshifting the step-ratio transmission and maintain a current gear of the step-ratio transmission. The controller is further programmed to, in response to selection of the off-road driving mode, the scheduled upshift of the step-ratio transmission, and the slip of the at least one drive wheel not exceeding the first threshold or the pitch of the vehicle not exceeding the second threshold or the position of the accelerator pedal not exceeding the third threshold, upshift the step-ratio transmission.

A vehicle includes a powerplant, at least one drive wheel, a transmission, and a controller. The powerplant is configured to generate power to propel the vehicle. The transmission is configured to deliver power from the powerplant to the at least one drive wheel. The controller is programmed to, in response to a scheduled upshift of the transmission and detection of a set of conditions that are indicative of the vehicle climbing while on loose terrain, override upshifting the transmission and maintain a current gear of the transmission. The controller is further programmed to, in response to the scheduled upshift of the transmission and non-detection of at least one condition of the set of conditions that are indicative of the vehicle climbing while on loose terrain, upshift the transmission.

A vehicle includes an engine, at least one drive wheel, a transmission, an accelerator pedal, and a controller. The engine is configured to generate power to propel the vehicle. The transmission is configured to deliver power from the engine to the at least one drive wheel. The transmission has a first shift schedule that corresponds to standard driving mode and a second shift schedule that corresponds to an off-road driving mode. The controller is programmed to, in response to selection of the off-road driving mode, a scheduled upshift of the transmission according to the second shift schedule, a slip of the at least one drive wheel exceeding a first threshold, a pitch of the vehicle exceeding a second threshold, and a position of the accelerator pedal exceeding a third threshold, override upshifting the transmission and maintain a current gear of the transmission. The controller is further programmed to, in response to selection of the off-road driving mode, the scheduled upshift of the transmission according to the second shift schedule, the slip of the at least one drive wheel not exceeding the first threshold or the pitch of the vehicle not exceeding the second threshold or the position of the accelerator pedal not exceeding the third threshold, upshift the transmission. The controller is further programmed to, in response to the scheduled upshift of the transmission and the slip of the at least one drive wheel not exceeding the first threshold or the pitch of the vehicle not exceeding the second threshold or the position of the accelerator pedal not exceeding the third threshold for greater than the predetermined period of time after overriding upshifting the transmission, upshift the transmission. The controller is further programmed to, in response to the scheduled upshift of the transmission and the slip of the at least one drive wheel not exceeding the first threshold or the pitch of the vehicle not exceeding the second threshold or the position of the accelerator pedal not exceeding the third threshold for less than the predetermined period of time after overriding upshifting the transmission, maintain overriding upshifting the transmission and maintain the current gear of the transmission.

DETAILED DESCRIPTION

Embodiments of the present disclosure are described herein. It is to be understood, however, that the disclosed embodiments are merely examples and other embodiments may take various and alternative forms. The figures are not necessarily to scale; some features could be exaggerated or minimized to show details of particular components. Therefore, specific structural and functional details disclosed herein are not to be interpreted as limiting, but merely as a representative basis for teaching one skilled in the art to variously employ the embodiments. As those of ordinary skill in the art will understand, various features illustrated and described with reference to any one of the figures may be combined with features illustrated in one or more other figures to produce embodiments that are not explicitly illustrated or described. The combinations of features illustrated provide representative embodiments for typical applications. Various combinations and modifications of the features consistent with the teachings of this disclosure, however, could be desired for particular applications or implementations.

Figure 1:
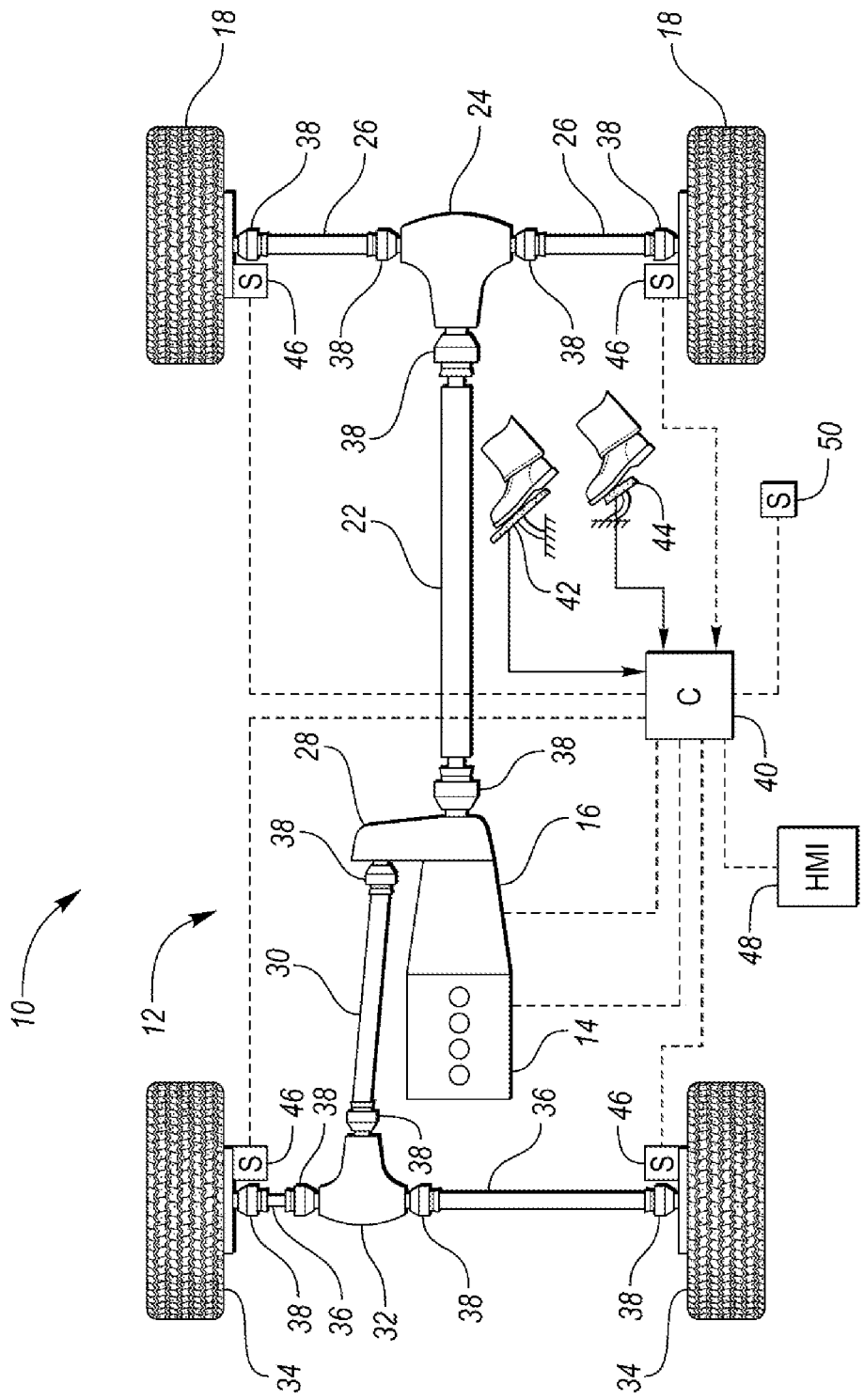
FIG. 1 is a schematic diagram representative of an exemplary vehicle and an exemplary vehicle powertrain.

Referring to FIG. 1, a schematic diagram representative of a vehicle 10 and a vehicle powertrain 12 is illustrated. The powertrain 12 includes power generating components (i.e., engines or electric motors) and the drivetrain. The drivetrain is the group of components that deliver power to the driving wheels, excluding the power generating components. In contrast, the powertrain 12 is considered to include both the power generating components and the drivetrain. The powertrain 12 may include an engine 14 and a transmission 16. The transmission 16 may be a multiple step-ratio automatic transmission. The powertrain 12 may utilize other power generating components (e.g., electric motors or fuel cells) in addition to or in lieu of the engine 14. The transmission 16 may be configured to provide multiple gear ratios between an input and an output of the transmission 16. The engine 14 is connected to the input of the transmission 16 while drivetrain components that are configured deliver power to rear drive wheels 18 are connected to an output of the transmission 16. More specifically, the engine 14 may be connected to an input shaft of the transmission by a torque converter or a launch clutch while an output shaft of the transmission 16 may be connected to a rear driveshaft 22. The rear driveshaft 22 may then be connected to a rear drive unit (RDU) 24. The RDU 24 may then be connected to the rear wheels 18 by rear half shafts 26. The RDU 24 may include a differential and/or one more clutches to control the power output to the rear wheels 18.

The transmission 16 may include gear sets (not shown) that are selectively placed in different gear ratios by selective engagement of friction elements such as clutches and brakes (not shown) to establish the desired multiple discrete or step drive ratios. The friction elements are controllable through a shift schedule that connects and disconnects certain elements of the gear sets to control the ratio between a transmission output shaft (e.g., driveshaft 22) and the transmission input shaft (e.g., a shaft connected to the crankshaft of the engine 14). The transmission 16 is automatically shifted from one ratio to another based on various vehicle and ambient operating conditions by an associated controller, such as a powertrain control unit (PCU). Power and torque from the engine 14 may be delivered to and received by transmission 16. The transmission 16 then provides powertrain output power and torque to driveshaft 22.

It should be understood that the hydraulically controlled transmission 16 used with a torque converter or launch clutch are but two examples of a gearbox or transmission arrangement; any multiple ratio gearbox that accepts input torque(s) from an engine and/or any type of powerplant (e.g., an electric motor) and then provides power and torque to via one drive wheels via an output shaft at the different ratios is acceptable for use with embodiments of the present disclosure.

The powertrain 12 may also include a power transfer unit (PTU) 28, which also may be called a power takeoff unit or transfer case, disposed between the transmission 16 and the rear driveshaft 22. The PTU 28 may include a clutch that selectively couples a front driveshaft 30 to the output of the transmission 16. The front driveshaft 30 may then be connected to a front drive unit (FDU) 32. The FDU 32 may then be connected to the front wheels 34 (which may be drive wheels when connect to a powerplant) by front half shafts 36. The FDU 32 may include a differential and/or one more clutches to control the power output to the front wheels 34.

The various components of the powertrain 12, including the output shaft of the transmission 16, rear driveshaft 22, RDU 24, half shafts 26, rear wheels 18, PTU 28, front driveshaft 30, front half shafts 36, and front wheels 34 may be connected to each other, as described above, via constant-velocity joints 38. Constant-velocity joints connect two rotating parts and allow the two rotating parts to rotate about different axes.

Although FIG. 1 depicts a rear-wheel drive vehicle that is capable operating in a four-wheel drive or all-wheel drive (AWD) mode via the PTU 28, the disclosure should not be construed as limited to rear-wheel drive vehicles. For example, the vehicle may be a front wheel drive vehicle that includes a power source (e.g., engine or electric motor) that is connected to a transaxle which in turn is connected to the front wheels. The transaxle may include a differential that is connected to the front wheels by half shafts. Constant-velocity joints may be disposed between any mating parts (e.g., between the half shaft and the wheels or between the half shaft and the transaxle. A PTU may also be connected to the transaxle. The PTU may be connected to an RDU in the same manner as described above relative the rear-wheel drive vehicle depicted in FIG. 1. When engaged the PTU may be configured to transfer power from the from axle to the RDU.

The PTUs and RDUs, in all embodiments, may function in the same manner as a differential to allow a speed differential between the wheels on a single axle. Clutches within the PTUs and the RDUs may be controlled to limit the speed differential between the wheels on a single axle such that the PTUs and RDUs operates as a limited slip differential. The PTUs and the RDUs may be controlled in unison allow a speed differential between the wheels located on of the different axles of the vehicle. Controlling the PTUs and the RDUs to allow a speed differential between the wheels located on different axles of the vehicle may be referred to as an AWD mode.

The powertrain 12 further includes an associated controller 40 such as a powertrain control unit (PCU). While illustrated as one controller, the controller 40 may be part of a larger control system and may be controlled by various other controllers throughout the vehicle 10, such as a vehicle system controller (VSC). It should therefore be understood that the powertrain control unit 40 and one or more other controllers can collectively be referred to as a "controller" that controls various actuators in response to signals from various sensors to control functions such as starting/stopping engine 14, select or schedule transmission shifts, etc. Controller 40 may include a microprocessor or central processing unit (CPU) in communication with various types of computer readable storage devices or media. Computer readable storage devices or media may include volatile and nonvolatile storage in read-only memory (ROM), random-access memory (RAM), and keep-alive memory (KAM), for example. KAM is a persistent or non-volatile memory that may be used to store various operating variables while the CPU is powered down. Computer-readable storage devices or media may be implemented using any of a number of known memory devices such as PROMs (programmable read-only memory), EPROMs (electrically PROM), EEPROMs (electrically erasable PROM), flash memory, or any other electric, magnetic, optical, or combination memory devices capable of storing data, some of which represent executable instructions, used by the controller in controlling the engine or vehicle.

The controller communicates with various engine/vehicle sensors and actuators via an input/output (I/O) interface (including input and output channels) that may be implemented as a single integrated interface that provides various raw data or signal conditioning, processing, and/or conversion, short-circuit protection, and the like. Alternatively, one or more dedicated hardware or firmware chips may be used to condition and process particular signals before being supplied to the CPU. As generally illustrated in the representative embodiment of FIG. 1, controller 40 may communicate signals to and/or from engine 14, transmission gearbox 16, torque converter, or launch clutch. Although not explicitly illustrated, those of ordinary skill in the art will recognize various functions or components that may be controlled by controller 40 within each of the subsystems identified above. Representative examples of parameters, systems, and/or components that may be directly or indirectly actuated using control logic and/or algorithms executed by the controller include fuel injection timing, rate, and duration, throttle valve position, spark plug ignition timing (for spark-ignition engines), intake/exhaust valve timing and duration, front-end accessory drive (FEAD) components such as an alternator, air conditioning compressor, battery, clutch pressures for launch clutch and transmission clutch, and the like. Sensors communicating input through the I/O interface may be used to indicate turbocharger boost pressure, crankshaft position (PIP), engine rotational speed (RPM), wheel speeds (WS1, WS2), vehicle speed (VSS), coolant temperature (ECT), intake manifold pressure (MAP), accelerator pedal position (PPS), ignition switch position (IGN), throttle valve position (TP), air temperature (TMP), exhaust gas oxygen (EGO) or other exhaust gas component concentration or presence, intake air flow (MAF), transmission gear, ratio, or mode, transmission oil temperature (TOT), transmission turbine speed (TS), torque converter bypass clutch 34 status (TCC), or deceleration or shift mode (MDE) for example.

Control logic or functions performed by controller 40 may be represented by flow charts or similar diagrams in one or more figures. These figures provide representative control strategies and/or logic that may be implemented using one or more processing strategies such as event-driven, interrupt-driven, multi-tasking, multi-threading, and the like. As such, various steps or functions illustrated may be performed in the sequence illustrated, in parallel, or in some cases omitted. Although not always explicitly illustrated, one of ordinary skill in the art will recognize that one or more of the illustrated steps or functions may be repeatedly performed depending upon the particular processing strategy being used. Similarly, the order of processing is not necessarily required to achieve the features and advantages described herein, but is provided for ease of illustration and description. The control logic may be implemented primarily in software executed by a microprocessor-based vehicle, engine, and/or powertrain controller, such as controller 40. Of course, the control logic may be implemented in software, hardware, or a combination of software and hardware in one or more controllers depending upon the particular application. When implemented in software, the control logic may be provided in one or more computer-readable storage devices or media having stored data representing code or instructions executed by a computer to control the vehicle or its subsystems. The computer-readable storage devices or media may include one or more of a number of known physical devices which utilize electric, magnetic, and/or optical storage to keep executable instructions and associated calibration information, operating variables, and the like.

An accelerator pedal 42 is used by the driver of the vehicle to provide a demanded torque, power, or drive command to propel the vehicle. In general, depressing and releasing the accelerator pedal 42 generates an accelerator pedal position signal that is representative of an accelerator pedal position and may be interpreted by the controller 40 as a demand for increased power or decreased power, respectively, or as a demand for increased torque or decreased torque, respectively. A brake pedal 44 is also used by the driver of the vehicle to provide a demanded braking torque to slow the vehicle. The brake pedal 44 may configured to actuate friction brakes to slow the vehicle through a hydraulic, electrical, or other system when applied. In general, depressing and releasing the brake pedal 44 generates a brake pedal position signal that may be interpreted by the controller 40 as a demand to decrease the vehicle speed. Based upon inputs from the accelerator pedal 42 and brake pedal 44, the controller 40 commands the torque to the engine 14 and friction brakes. The controller 40 also controls the timing of gear shifts within the transmission 16 based on one or more shift schedules that may be stored as tables within the controller. The shift schedules may be based on a demanded torque or power output via the accelerator pedal and a speed of the vehicle.

The vehicle 10 also includes speed sensors 46 that are disposed about or proximate the wheels 18. The speed sensors 46 are configured to communicate the wheel speeds, including any slip of the wheels back to the controller 40. Wheel slip may be the difference between the speed of a wheel (converted from rotational speed to linear speed) and the linear speed of the vehicle 10.

The vehicle may also include a human machine interface (HMI) 48 that is configured to communicate with the controller 40. The vehicle operator may be configured to select a standard driving mode for the vehicle 10 or an off-road driving mode via the HMI 48. The transmission 16 may include a first shift schedule that corresponds to the standard driving mode and a second shift schedule that corresponds to the off-road driving mode. Off-road driving modes may include, but are not limited to, a deep sand driving mode, a mud driving mode, a rock crawl driving mode, and a Baja driving mode. Deep sand driving mode may be used for off road driving on soft dry sand such as sand dunes. Mud driving mode may be used for crossing muddy, rutted, or soft uneven terrain. Rock crawl driving mode may be used for very low speed and controlled crossing of aggressive uneven terrain. Baja driving mode may be used for high speed off roading and desert running.

The vehicle 10 may include one or more sensors 50, such as accelerometers, that are configured to determine a gradient of a road surface that the vehicle 10 is positioned on. More specifically, the one or more sensors 50 may be configured to detect a pitch angle of the vehicle 10. The one or more sensors 50 may be configured to communicate the road gradient and/or pitch angle of the vehicle 10 to the controller 40.

It should be understood that the vehicle configuration described herein is merely exemplary and is not intended to be limited. Other non-hybrid, electric, or hybrid vehicle configurations should be construed as disclosed herein. For example, the vehicle 10 may include an electric motor as a powerplant as opposed to or in addition to the engine 14. Other vehicle configurations may include, but are not limited to, micro-hybrid vehicles, series hybrid vehicles, parallel hybrid vehicles, series-parallel hybrid vehicles, plug-in hybrid electric vehicles (PHEVs), fuel cell hybrid vehicles, battery operated electric vehicles (BEVs), or any other vehicle configuration known to a person of ordinary skill in the art.

Upshifting while climbing sandy/loose terrain may result in a loss of tractive force during and after an upshift. The post upshift engine speed may then be unconstrained by a revolution limiter, which could result in higher wheel speeds and lower traction. A typical goal of recreational off-road/deep-sand driving is to make it up and over steep hills with sandy or loose terrain. The sandy/loose terrain will almost always allow the wheels to spin. The wheel spin may cause upshifting of the automatic transmission, since the shift schedule may be based off an output speed of the transmission.

The vehicle may be equipped with manual a mode which allows the operator to select a gear within the transmission, via a manual gear shifter, and hold the selected gear at the revolution limit of the gear (i.e., the rotational speed at which the transmission is configured to upshift from a specific gear per a shift schedule) without upshifting. In many off-road scenarios, vehicle operators may experience enhanced capability by manually selecting gears rather than utilizing the automatic shifting of the selected drive mode (e.g., deep sand driving mode, mud driving mode, rock crawl driving mode, Baja driving mode, etc.).

This solution described as method 100 below allows customers to utilize the automatically shifting drive modes (e.g., deep sand driving mode, mud driving mode, rock crawl driving mode, Baja driving mode, etc.) in all scenarios. Manual shifting becomes an option rather than a necessity to climb grades. Vehicle operators may benefit from optimal system capability in specific extreme conditions in their selected drive-mode, without compromising drivability, fuel or noise, vibration, and harshness (NVH) under normal operating conditions. Vehicle operators may focus on the terrain and driving with both hands on the steering wheel in an automatic drive mode versus attempting manual shifting.

Figure 2:
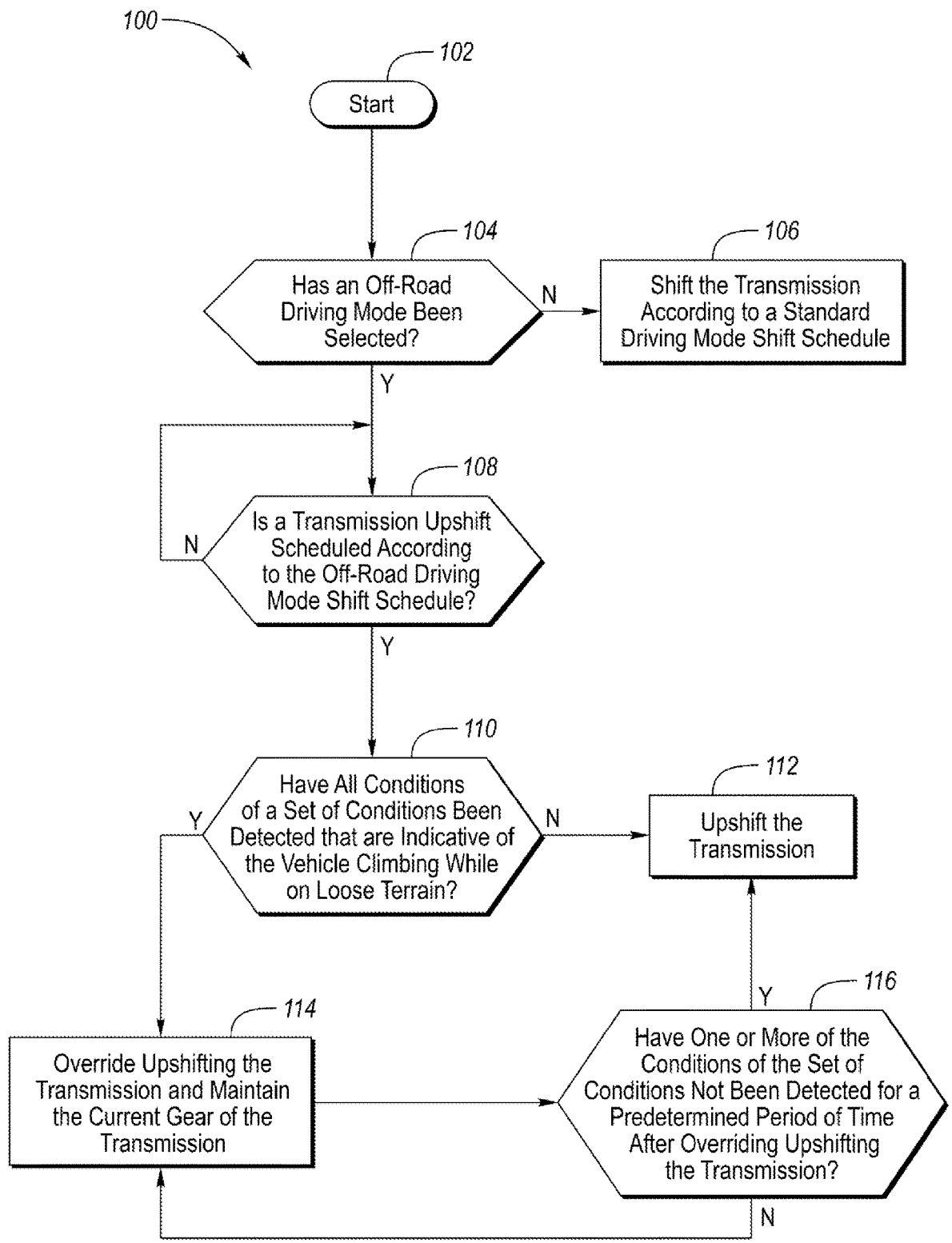
FIG. 2 is a flowchart illustrating a method of shifting a transmission while the vehicle is in an off-road mode.

Referring to FIG. 2, a method 100 of shifting the transmission 16 while the vehicle 10 is in an off-road mode is illustrated. The method 100 may be stored as control logic and/or an algorithm within the controller 40. The controller 40 may implement the method 100 by controlling the various components of the vehicle 10. The method 100 is initiated at start block 102. The method 100 may be initiated at start block 102 by turning a start key or ignition of the vehicle 10 to an "on" position. The method 100 then moves on to block 104 where it is determined if an off-road driving mode has been selected (e.g., has the vehicle operator selected any off-road driving mode, including the off-road driving modes listed herein, via the HMI 48). If the answer at block 104 is NO, the method 100 moves on to block 106 where the transmission 16 is commanded to shift (i.e., upshift or downshift) according to a standard driving mode shift schedule (e.g., the transmission 16 is commanded to shift according to the first shift schedule that corresponds to the standard driving mode). The standard driving mode may correspond to a driving mode that is not an off-road driving mode.

Returning to block 104, if the answer at block 104 is YES, the method 100 moves on to block 108 where it is determined if a transmission upshift (i.e., a shift from a lower gear to a higher gear, such as a shift from $1^{st}$ gear to $2^{nd}$ gear) has been scheduled according to the off-road driving mode shift schedule (e.g., it is determined if the transmission 16 is commanded to upshift according to the second shift schedule that corresponds to the off-road driving mode). If the answer at block 108 is NO, the method 100 recycles back to the beginning of block 108. If the answer at block 108 is YES, the method 100 moves on to block 110.

At block 110 it is determined if all conditions of a set of conditions have been detected that are indicative that the vehicle 10 is climbing while on loose terrain. The set of conditions may include a slip of at least one drive wheel (e.g., wheels 18 and/or wheels 34) exceeding a slip speed threshold, a pitch of the vehicle 10 exceeding a pitch angle threshold, and a position of the accelerator pedal 42 exceeding a position threshold. If at least one condition of the set of conditions have not been detected at block 110 (e.g., the slip of at least one drive wheel does not exceed the slip speed threshold, the pitch of the vehicle 10 does not exceed the pitch angle threshold, or the position of the accelerator pedal 42 does not exceed the position threshold), the method 100 moves on to block 112, where the transmission 16 is upshifted according to the off-road driving mode shift schedule (e.g., the transmission 16 is upshifted according to the second shift schedule that corresponds to the off-road driving mode).

Returning to block 110, if all conditions of the set of conditions have been detected at block 110 (e.g., the slip of at least one drive wheel does exceed the slip speed threshold, the pitch of the vehicle 10 does exceed the pitch angle threshold, and the position of the accelerator pedal 42 does exceed the position threshold), the method 100 moves on to block 114, where the upshift of the transmission 16 is overridden and a current gear of the transmission 16 is maintained (e.g., if an upshift from $1^{st}$ gear to $2^{nd}$ gear in the transmission 16 is scheduled, the transmission will remain in $1^{st}$ gear due to the detection of all of the set of conditions).

The method 100, then moves on to block 116 where it is determined if one or more of the conditions of the set of conditions (e.g., the slip of at least one drive wheel exceeding the slip speed threshold, the pitch of the vehicle 10 exceeding the pitch angle threshold, or the position of the accelerator pedal 42 exceeding the position threshold) have not been detected for a predetermined period of time after overriding upshifting the transmission 16 at block 114. If the answer at block 116 is NO (i.e., if the all conditions of the set of conditions are still being detected, or if one or more of the set of conditions have transitioned from a detected state to a non-detected state but it is less than the predetermined period of time since the one or more of the set of conditions had transitioned from the detected state to the non-detected state), the method 100 recycles back to block 114 where the method 100 continues to override upshifting the transmission 16 and continues to maintain the current gear of the transmission 16. If the answer at block 116 is YES (i.e., if one or more of the conditions of the set of conditions have transitioned from the detected state to the non-detected state and it is greater than the predetermined period of time since the one or more conditions of the set of conditions had transitioned from the detected state to the non-detected state), the method moves on to block 112 where the transmission 16 is upshifted according to the off-road driving mode shift schedule.

It should be understood that the flowchart in FIG. 2 is for illustrative purposes only and that the method 100 should not be construed as limited to the flowchart in FIG. 2. Some of the steps of the method 100 may be rearranged while others may be omitted entirely. It should be further understood that the designations of first, second, third, fourth, etc. for any component, state, or condition described herein may be rearranged in the claims so that they are in chronological order with respect to the claims.

The words used in the specification are words of description rather than limitation, and it is understood that various changes may be made without departing from the spirit and scope of the disclosure. As previously described, the features of various embodiments may be combined to form further embodiments that may not be explicitly described or illustrated. While various embodiments could have been described as providing advantages or being preferred over other embodiments or prior art implementations with respect to one or more desired characteristics, those of ordinary skill in the art recognize that one or more features or characteristics may be compromised to achieve desired overall system attributes, which depend on the specific application and implementation. As such, embodiments described as less desirable than other embodiments or prior art implementations with respect to one or more characteristics are not outside the scope of the disclosure and may be desirable for particular applications.

What is claimed is:

1. A vehicle comprising:
a powerplant configured to generate power to propel the vehicle;
at least one drive wheel;
a step-ratio transmission configured to deliver power from the powerplant to the at least one drive wheel, the step-ratio transmission having a shift schedule that corresponds to an off-road driving mode;
an accelerator pedal; and
a controller programmed to,
in response to selection of the off-road driving mode, a scheduled upshift of the step-ratio transmission according to the shift schedule, a slip of the at least one drive wheel exceeding a first threshold, a pitch of the vehicle exceeding a second threshold, and a position of the accelerator pedal exceeding a third threshold, override upshifting the step-ratio transmission and maintain a current gear of the step-ratio transmission, and
in response to selection of the off-road driving mode, the scheduled upshift of the step-ratio transmission, and the slip of the at least one drive wheel not exceeding the first threshold or the pitch of the vehicle not exceeding the second threshold or the position of the accelerator pedal not exceeding the third threshold, upshift the step-ratio transmission.

2. The vehicle of claim 1, wherein the controller is further programmed to, in response to the scheduled upshift of the step-ratio transmission and the slip of the at least one drive wheel not exceeding the first threshold for a predetermined period of time after overriding upshifting the step-ratio transmission, upshift the step-ratio transmission.

3. The vehicle of claim 1, wherein the controller is further programmed to, in response to the scheduled upshift of the step-ratio transmission and the pitch of the vehicle not exceeding the second threshold for a predetermined period of time after overriding upshifting the step-ratio transmission, upshift the step-ratio transmission.

4. The vehicle of claim 1, wherein the controller is further programmed to, in response to the scheduled upshift of the step-ratio transmission and the position of the accelerator pedal not exceeding the third threshold for a predetermined period of time after overriding upshifting the step-ratio transmission, upshift the step-ratio transmission.

5. The vehicle of claim 1, wherein the off-road driving mode is a deep sand driving mode.

6. The vehicle of claim 1, wherein the off-road driving mode is a mud driving mode.

7. The vehicle of claim 1, wherein the off-road driving mode is a rock crawl driving mode.

8. The vehicle of claim 1, wherein the off-road driving mode is a Baja driving mode.

9. A vehicle comprising:
a powerplant configured to generate power to propel the vehicle;
at least one drive wheel;
a transmission configured to deliver power from the powerplant to the at least one drive wheel; and
a controller programmed to,
in response to a scheduled upshift of the transmission and detection of a set of conditions that are indicative of the vehicle climbing while on loose terrain, override upshifting the transmission and maintain a current gear of the transmission, and
in response to the scheduled upshift of the transmission and non-detection of at least one condition of the set of conditions that are indicative of the vehicle climbing while on loose terrain, upshift the transmission.

10. The vehicle of claim 9, wherein the set of conditions that are indicative of the vehicle climbing while on loose terrain include a slip of the at least one drive wheel exceeding a threshold.

11. The vehicle of claim 10, wherein the controller is further programmed to, in response to the scheduled upshift of the transmission and the slip of the at least one drive wheel not exceeding the threshold for a predetermined period of time after overriding upshifting the transmission, upshift the transmission.

12. The vehicle of claim 9, wherein the set of conditions that are indicative of the vehicle climbing while on loose terrain include a pitch of the vehicle exceeding a threshold.

13. The vehicle of claim 12, wherein the controller is further programmed to, in response to the scheduled upshift of the transmission and the pitch of the vehicle not exceeding the threshold for a predetermined period of time after overriding upshifting the transmission, upshift the transmission.

14. The vehicle of claim 9 further comprising an accelerator pedal, and wherein the set of conditions that are indicative of the vehicle climbing while on loose terrain include a position of the accelerator pedal exceeding a threshold.

15. The vehicle of claim 14, wherein the controller is further programmed to, in response to the scheduled upshift of the transmission and the accelerator pedal not exceeding the threshold for a predetermined period of time after overriding upshifting the transmission, upshift the transmission.

16. A vehicle comprising:
an engine configured to generate power to propel the vehicle;
at least one drive wheel;
a transmission configured to deliver power from the engine to the at least one drive wheel, the transmission having a first shift schedule that corresponds to standard driving mode and a second shift schedule that corresponds to an off-road driving mode; and
an accelerator pedal; and
a controller programmed to,
in response to selection of the off-road driving mode, a scheduled upshift of the transmission according to the second shift schedule, a slip of the at least one drive wheel exceeding a first threshold, a pitch of the vehicle exceeding a second threshold, and a position of the accelerator pedal exceeding a third threshold, override upshifting the transmission and maintain a current gear of the transmission,
in response to selection of the off-road driving mode, the scheduled upshift of the transmission according to the second shift schedule, the slip of the at least one drive wheel not exceeding the first threshold or the pitch of the vehicle not exceeding the second threshold or the position of the accelerator pedal not exceeding the third threshold, upshift the transmission,
in response to the scheduled upshift of the transmission and the slip of the at least one drive wheel not exceeding the first threshold or the pitch of the vehicle not exceeding the second threshold or the position of the accelerator pedal not exceeding the third threshold for greater than the predetermined period of time after overriding upshifting the transmission, upshift the transmission, and in response to the scheduled upshift of the transmission and the slip of the at least one drive wheel not exceeding the first threshold or the pitch of the vehicle not exceeding the second threshold or the position of the accelerator pedal not exceeding the third threshold for less than the predetermined period of time after overriding upshifting the transmission, maintain overriding upshifting the transmission and maintain the current gear of the transmission.

17. The vehicle of claim 16, wherein the off-road driving mode is a deep sand driving mode.

18. The vehicle of claim 16, wherein the off-road driving mode is a mud driving mode.

19. The vehicle of claim 16, wherein the off-road driving mode is a rock crawl driving mode.

20. The vehicle of claim 16, wherein the off-road driving mode is a Baja driving mode.

* * * * *